United States Patent [19]

Robertson et al.

[11] 4,030,205

[45] June 21, 1977

[54] DRYING SYSTEM FOR PARTICLES

[76] Inventors: Joseph D. Robertson, 980 Swathmore Drive, NW., Atlanta, Ga. 30327; Dean L. Ward, 414 James St., Lilburn, Ga. 30247

[22] Filed: Dec. 29, 1975

[21] Appl. No.: 644,902

[52] U.S. Cl. .................................. 34/12; 34/28; 34/60; 432/18
[51] Int. Cl.$^2$ ................................... F26B 7/00
[58] Field of Search ............ 432/18; 34/12, 26, 27, 34/28, 60

[56] References Cited

UNITED STATES PATENTS

| | | | |
|---|---|---|---|
| 1,920,107 | 7/1933 | Richardson | 34/12 X |
| 2,012,098 | 8/1935 | Haase et al. | 34/28 X |
| 2,427,276 | 9/1947 | Hagedon | 34/28 X |
| 2,871,575 | 2/1959 | Dupont | 34/60 X |
| 3,621,585 | 11/1971 | Robertson | 34/80 |

*Primary Examiner*—John J. Camby

*Attorney, Agent, or Firm*—Jones, Thomas & Askew

[57] ABSTRACT

A system for drying particulate materials such as amorphous polyethylene teraphthalate or other materials that tend to fuse or agglomerate while being heated includes the steps of directing into the lower portion of a dispensing hopper filled with particles of the material a stream of hot dry air at a temperature above the temperature range in which the particles are unstable and tend to cling to one another and allowing the stream of air to pass upwardly through the particles in the hopper and to transfer its heat to the particles and form a temperature gradient in the body of particles in the hopper which is higher than the critical temperature range of the material at the lower portion of the hopper and which causes the particles to pass through the critical temperature range as the particles are dispensed downwardly from the hopper. The particles are agitated in the critical temperature range to prevent the particles from clinging to one another.

10 Claims, 3 Drawing Figures

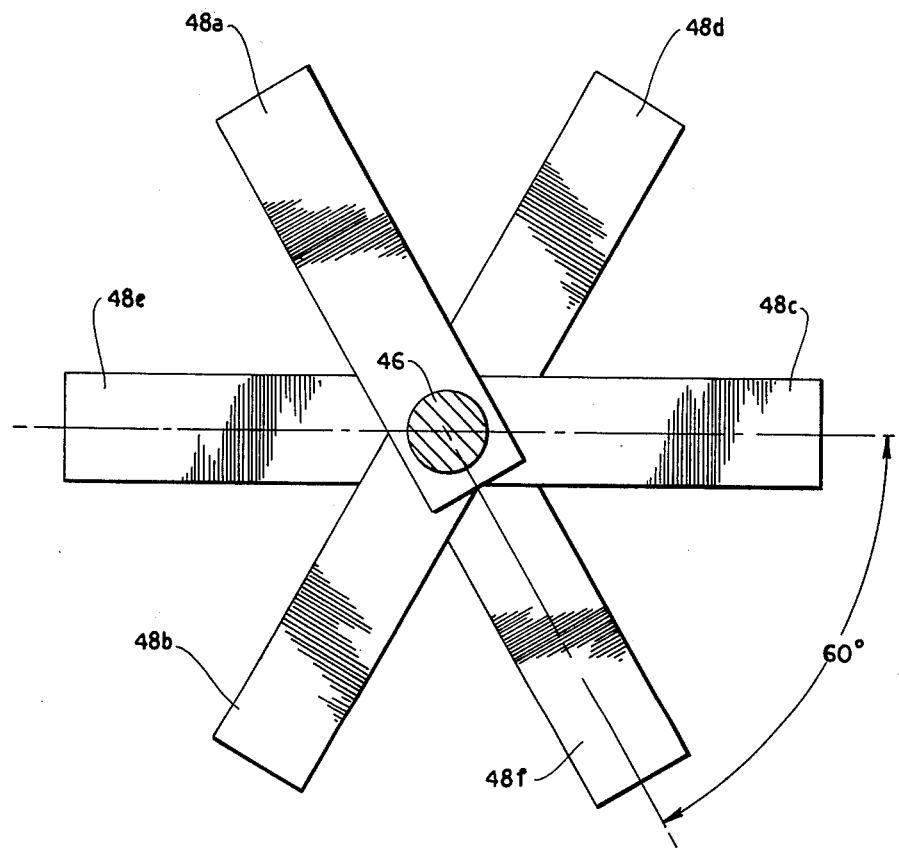
Fig_3

DRYING SYSTEM FOR PARTICLES

BACKGROUND OF THE INVENTION

When hygroscopic materials are to be dispensed through a manufacturing process, wherein, for example, the materials are heated, pressurized and extruded, it is desirable, usually necessary, to dry the materials before they are passed through the manufacturing process. Many of the materials which are purchased by the processor for further processing are in the form of solid particles, such as beads, pellets or chips. As the particles pass through a critical temperature range, if the particles are in physical contact with one another, frequently they tend to cling together and do not flow readily. Therefore, when the particles are dispensed from a hopper, the clinging together of the particles tends to plug the hopper.

In the past, the drying of such particulate materials has been performed at a temperature level below the critical temperature range of the material so as to avoid the problem of plugging the storage dispenser, or, in the alternative, the material has been heated to a temperature level above the critical range of temperatures and simultaneously agitated to prevent the particles from clinging together, so that once the particles have been heated through the critical temperature range, the particles could be stored, allowed to cool, and when the particles were to be processed, the particles could be transferred to a dispensing hopper where they are dried at elevated temperatures prior to the step of processing the particles.

In the first situation, where the upper drying temperature level is maintained at a low temperature to avoid instability of the particles, the drying procedure is relatively slow and requires a large hopper, and the material being processed is delivered to the processing machine at a relatively low temperature and not in the most desirable condition for further processing. In the second situation where the material is heated and agitated by a separate piece of equipment through the critical temperature range, the separate equipment is expensive to purchase and maintain, and the operation of the equipment requires energy and operator time.

SUMMARY OF THE INVENTION

Briefly described, the present invention comprises a drying system for particles such as amorphous hygroscopic materials, including such materials as polyethylene teraphthalate and other "polyesters," wherein the particles have a "critical" temperature range in which the particles tend to cling to one another. The particles are fed into a dispenser hopper which can dispense the particles directly to an extruder or to another processing machine, and a stream of hot, dry air at a temperature higher than the critical temperature range of the particulate material is directed into the lower portion of the hopper and exhausted from the upper portion of the hopper, creating a temperature gradient in the material in the hopper, whereupon the material in the lower portion of the hopper is in a high temperature zone where the temperature of the particulate material is higher than the critical temperature of the material, the particulate material in the upper portion of the hopper is in a low temperature zone which is lower than the critical temperature of the material, and the particulate material in the intermediate portion of the hopper is in an intermediate temperature zone which has a gradient which exceeds the upper and lower limits of the critical temperature range of the material. A agitator continuously agitates the material in the intermediate temperature zone to assure that the particles are restrained from clinging to one another. The particles are progressively dispensed downwardly through the hopper and must pass through the intermediate temperature zone of the hopper. Under unusual conditions, as when the processing system is being started or when a hopper is first being filled with the material to be processed, the material may not have been required to progressively pass through the intermediate temperature zone. To avoid having the particles cling together in the high temperature zone at the lower portion of the hopper, additional agitating means are provided to agitate all material in the hopper, particularly the material in the lower, hotter portion of the hopper.

Thus, it is an object of this invention to provide a drying system for amorphous particles or the like which tend to cling together during the drying operation wherein the system operates continuously to heat and dry the particles substantially without allowing the particles to cling to one another.

Another object of the present invention is to provide a drying system for amorphous particles or the like which functions continuously and inexpensively to effectively condition the particles for further processing.

Other objects, features and advantages of the present invention will become apparent upon reading the following specification, when taken in conjunction with the accompanying drawing.

BRIEF DESCRIPTION OF THE DRAWING

FIG. 3 is a top view of the agitator of FIG. 2.

DESCRIPTION OF AN EMBODIMENT

Figure 1:
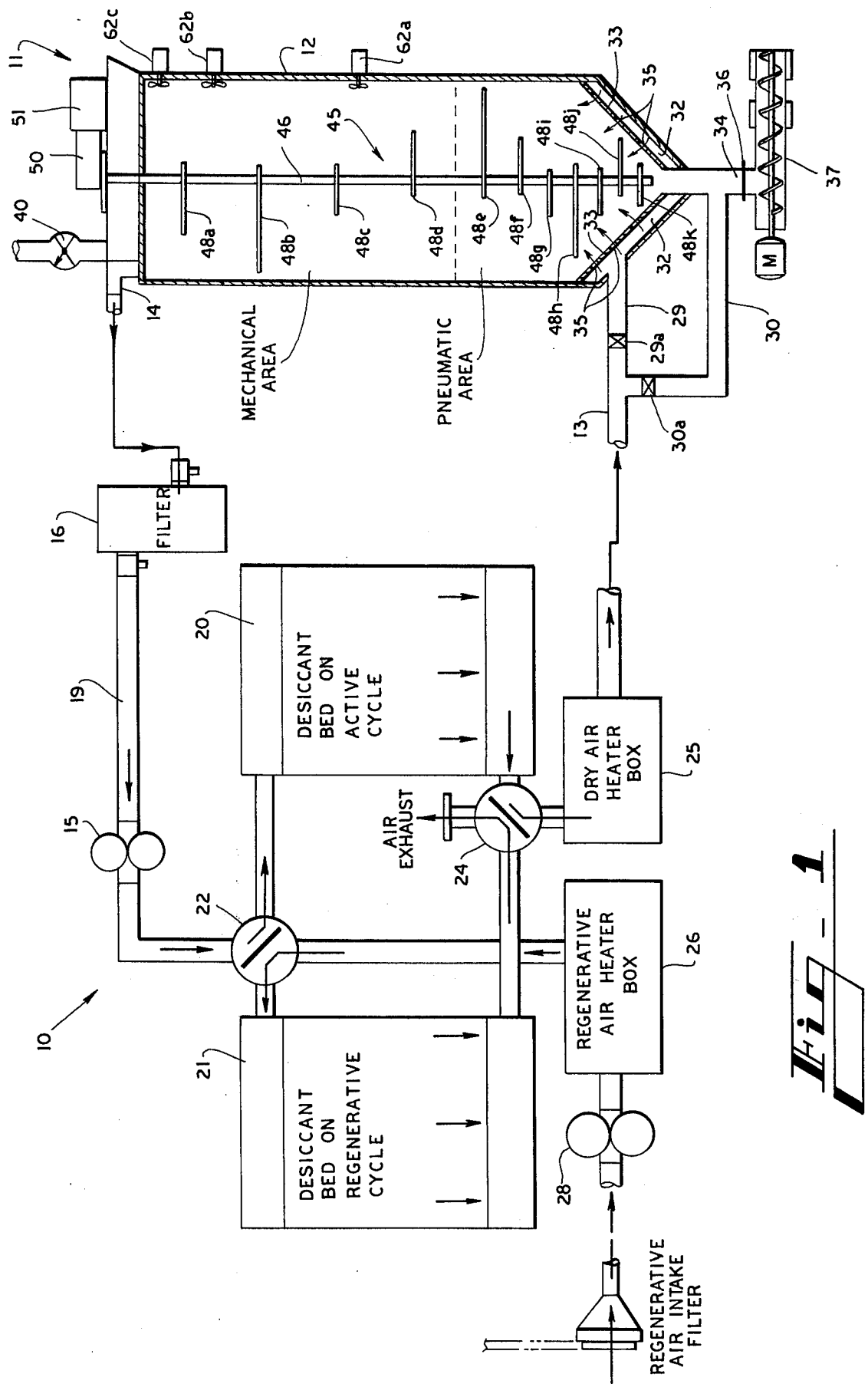
FIG. 1 is a schematic illustration of the drying system.

Referring now in more detail to the drawing, in which like numerals indicate like parts throughout the several views, FIG. 1 schematically illustrates the drying system which includes an air supply section 10 and a dispenser section 11. Air supply section 10 is of the type illustrated in U.S. Pat. No. 3,621,585 and functions to supply hot dry air to dispenser section 11.

Dispenser section 11 includes hopper 12 having an air supply inlet conduit system 13 and an air exhaust 14. Air supply section 10 includes a positive displacement blower 15 having its inlet communicating with the air exhaust 14 of hopper 12, a filter 16, and a conduit system 19 which recirculates the air from the air exhaust 14 of the hopper 12 back to the air supply inlet conduit system 13. The air supply section 10 further includes a pair of desiccant beds 20 and 21, air directing valves 22 and 24, air heaters 25 and 26, and regenerative blower 28. The valves 22 and 24 are arranged to cause air to recirculate through the air supply section 10 from the hopper 12 through one of the desiccant beds 20 or 21 while the opposite desiccant bed is being regenerated by blower 28 and air heater 26.

Figure 2:
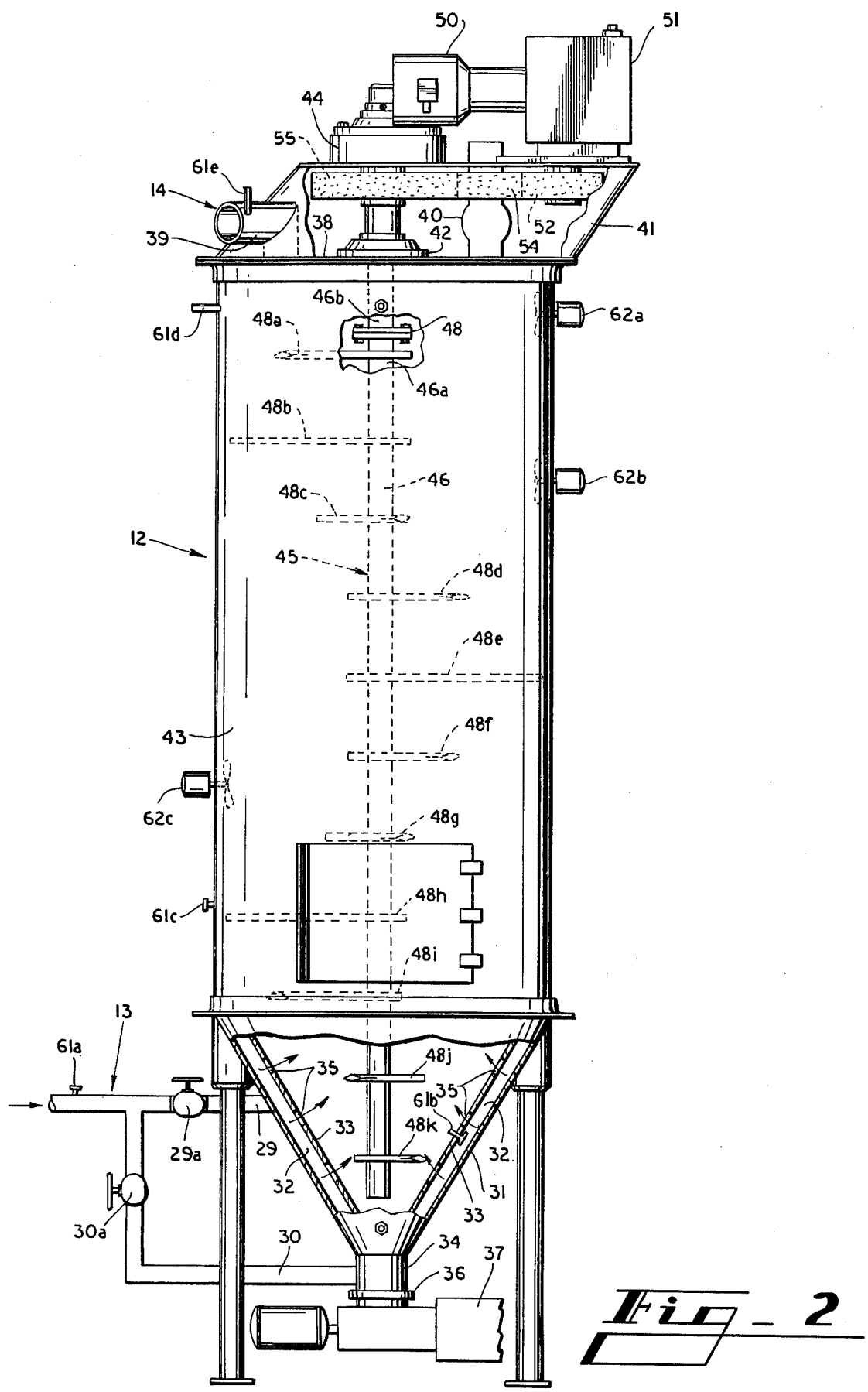
FIG. 2 is a side elevational view of the hopper with certain internal portions shown in broken line and with certain external portions shown broken away.

As is illustrated in FIG. 2, the air supply inlet conduit system 13 of hopper 12 includes upper and lower air branches 29 and 30 with control valves 29a and 30a for regulating the air flow therethrough, and upper air branch 29 extends through the lower external conical section 31 to the annular conical space 32 between lower external conical section 31 and internal conical section 33, and lower air branch 30 communicates with the particle discharge throat 34 at the bottom of the hopper 12. A plurality of air openings 35 are formed in the lower internal conical section of the hopper so that the heated air supplied to the annular conical space 32 flows upwardly through the internal conical section and into the lower portion of the hopper 12. A valve plate 36 functions to open and close the lower opening of the hopper, and an extruder 37 or the like is positioned below the valve 36 and when the extruder is operated, it functions as a dispenser and dispenses the particles from the lower end of the hopper 12 without permitting the air in the hopper to escape through the particle discharge throat 34 which functions as a particle outlet means.

The upper end of the hopper 12 is closed by a flat cover plate 38 and a conduit 39 extends through the cover plate and is part of the air exhaust 14. An opening (not shown) in cover plate 38 functions as an inlet opening for the material to be processed in the drying system, and a rotary feeder air lock 40 communicates with the opening and supplies unprocessed material to hopper 12. Thus, the rotary feeder air lock 40 and its opening through the cover plate 38 function as a particles inlet to supply the particles to the hopper 12. A supply means such as another hopper or a conveyor functions to supply the particles inlet with a ready supply of particles to be processed.

A supporting framework 41 is mounted on the upper end of hopper 12 over cover plate 38, and thrust bearings 42 and 44 are supported by cover plate 38 and supporting framework 41. An agitator 45 is positioned in the upper cylindrical portion 43 of hopper 12 and includes an upright rotatable shaft 46 that extends from inside hopper 12 up through cover plate 38 and is supported at its upper end by bearings 42 and 44. The shaft 46 includes a coupling 48 that permits the lower portion of the shaft 46a to be separated from the upper portion 46b for purposes of repair, cleaning, etc. A plurality of agitator blades 48a, 48b, 48c, 48d, 48e, 48f, 48g, 48h, 48i, 48j and 48k are each rigidly connected to the lower portion 46a of shaft 46 at spaced intervals along the height of the shaft and each blade extends in a horizontal direction outwardly from the upright shaft toward the inner surface of the hopper. As is illustrated in FIG. 3, each agitator blade 48a–48k extends radially outwardly from shaft 46 at angles of approximately 60° with respect to one another. Each of the blades 48a–48k is approximately wedge-shaped in cross section so as to present a relatively thin leading edge while a portion of each blade is relatively thick. Thus, when the agitator 45 rotates, the leading edge of the agitator blades is able to separate the particles in hopper 12 without requiring an excessive amount of power.

Motor 50 and gear reduction assembly 51 are mounted on supporting framework 41, and a driving pulley or sprocket 52 drives a belt or chain drive 54 which connects the motor or power means to the driven pulley or sprocket 55 of the agitator. Thus, the motor, agitator and related elements function as a mechanical mixing means for agitating or stirring the material present in hopper 12.

A plurality of thermocouples 61a, 61b, 61c, 61d, 61e and 61f are positioned about hopper 12 and function as temperature sensing means so as to detect the temperature of the air and material in hopper 12 and to control the functions of the drying system. Temperature sensor 61a is located at air supply inlet 13 and detects the temperature of the air stream moving into hopper 12 and controls the electrical heating elements in heater box 25, to increase or decrease the temperature of the air stream. Temperature sensing means 61b is located at the lower end of lower conical section 34 of hopper 12 and provides an indication of the temperature of the material flowing through the discharge throat. Temperature sensing means 61c is located at the lower portion of cylindrical section 31 of hopper 12 and functions to provide an indication of the temperature of the material at this position in the hopper. Temperature sensor 61d is located above the uppermost agitator blade 48a and provides an indication of the temperature of the air and of any material at this level in the hopper 12. Temperature sensor 61e is located in the air outlet 39 to provide a temperature indication at this position.

A plurality of material level indicators 62a, 62b and 62c are positioned about hopper 12. Level indicator 62c is located near the lower portion of the cylindrical section 31 of hopper 12 and functions to initiate an alarm to indicate that the level of the material in hopper 12 is dangerously low. Material level indicator 62b is located above level indicator 62c and functions to control the operation of particles inlet 40, to begin the operation of the rotary feeder 40 when the level of the material is lower than the level of indicator 62b. Material level indicator 62a is located just below the cover plate 38 of hopper 12 and functions to terminate the operation of the rotary feeder 40 and to activate a timer (not shown) which, when timed out, initiates the operation of the rotary feeder 40 if the indicator 62a has been uncovered.

OPERATION

The material to be processed through the system is supplied in a particle form, such as pellets, chips or beads of material, so that the particles tend to flow under the influence of gravity, and the material is likely to be a hygroscopic amorphous material such as polyethylene terephthalate or any of the so-calld "polyesters," which when heated have a tendency when passing through a critical temperature range to cling together.

When the hopper 12 is full of the material and the drying system is in continuous operation, a stream of air is heated by heater box 25 and directed through air supply inlet conduit system 13 into the annular conical space 32 and upwardly through the perforated inner conical section 33 at the bottom of the hopper 12. The air is dried and heated by the air supply section 10 to a temperature substantially above the critical temperature range of the material. The air moving into the lower conical portion of hopper 12 moves upwardly through the material in the cylindrical section 43 of the hopper and finally out of the air outlet 39 at cover plate 38. The particles of material in the lower portion of hopper 12 are heated to a temperature level above the critical temperature of the material, and as the particles of material are dispensed from the lower portion of the hopper 12 more material is introduced into the hopper at the upper end through rotary particles feeder 49. Thus, a temperature gradient is formed in the material. The particles of material being introduced to the hopper at its upper end will enter the hopper usually at ambient temperature, say 20° C., and the stream of hot air flowing upwardly through the hopper tends to elevate the temperature of the particles. The upper portion of the hopper 12 is a low temperature zone, and as the particles of material move in a downward direction through the hopper, they become warmer and they also enter the mechanical agitation area of the hopper where the agitator blades 48a–48k are moving. The mechanical agitation area is also the intermediate temperature zone of the hopper wherein the temperature gradient of the material extends both below and above the critical or unstable temperature of the material being processed by the drying system. The lower portion of the hopper is the high temperature zone where the particles of material normally have been heated to a temperature higher than the critical or unstable temperature range of the material.

During the continuous operation of the drying system, the agitator mechanically disturbs the material in the intermediate temperature zone, where the temperature of the material is passing through the critical temperature range, so that the particles are not allowed to cling together or bridge or plug the hopper and the flow of hot air through all portions of the body of material is assured. As the particles of material move downwardly through the intermediate temperature zone, their temperature level will be increased to a level higher than the critical temperature.

When the operation of the drying system is being started and there is no material present in hopper 12, the operation of air supply section 10 is initiated and adjusted and the particles of material are then progressively fed into hopper 12. Since the particles of material will be at room temperature, and since the particles of material will fall directly to the lower portion of hopper 12, the material will pass through the critical temperature range at a low level in the hopper. Thus, there will be an opportunity for the particles to cling together as they pass through the critical temperature range in the lower portion of the hopper, therefore requiring agitation in the hopper. The flow of heated air from the air supply section 10 into the lower portion of the hopper and the lowermost blades of the agitator 45 assure that the new supply of particles in the lower portion of the hopper will be agitated to the extent that the particles will not have the opportunity to adhere to one another.

Temperature sensor 61a detects and regulates the temperature of the stream of air from heater box 25 by controlling the heating elements (not shown) in the heater box. When the level of the particles of material recedes below material level indicators 62a, 62b or 62c indicator lights are actuated to alert the system operator. Also, the level indicators can be used to automatically initiate other functions, such as the rotary particles feeder 40 to introduce a new supply of particles to the hopper.

The agitator 45 is operated continuously by its motor 50 so as to mechanically disturb the particles of material in the hopper, and the shape of the agitator blades 48a–48k causes the materials to be lifted and disturbed continously, therefore inhibiting the clinging or adhesion of the materials to one another.

The air supply section 10 functions as described in U.S. Pat. No. 3,621,585, in that air is recycled from the exhaust to the inlet of the hopper 12, and during the recycling of the air, the air may be cooled by a pre-cooler (not shown), filtered by filter 16, passed through blower 15 to one of the desiccant beds 20 or 21, and then through heater box 25 and back to the air supply inlet 13 of the hopper. The relatively low temperature of the air reaching one of the desiccant beds and the desiccant material in the desiccant bed tends to extract the moisture from the air, and when the air is heated again by heater box 25, its dew point will be lower than when leaving the hopper. When the active desiccant bed becomes saturated, the valves 22 and 24 of the air supply section can be shifted to deactivate the desiccant bed and put the opposite desiccant bed in the flow stream. In the meantime, the wet desiccant bed can be regenerated by blower 28 and heater box 26.

Since the critical temperature range of different materials will vary, the temperature of the air stream moving through the hopper 12 can be varied to be compatible with the particular material being processed through the drying system and with the rate of dispensing of the material from the hopper. For example, the usual critical temperature range of polyethylene terephthalate is in the approximate range of 80° C to 120° C. Thus, the particles of material moving through the intermediate temperature zone of the hopper must have a temperature gradient exceeding the critical temperature range of the material. In one example of operation of the hopper, the temperature of the hot, dry air stream introduced to the lower portion of hopper 12 is between 185° C. and 195° C. The temperature of the particles of material in the lower portion of the hopper approaches the temperature of the heated air and as the air moves up through the hopper 12, it gives up its heat to the particles of material, so that with a continuous material throughput by the time the air reaches the top of the mass of material in the hopper, the air is relatively cool. Thus, with a continuous material throughout the temperature of the material is highest at the lower portion of the hopper and lowest at the upper portion of the hopper.

During operation with a continuous material throughput the intermediate temperature zone of the hopper where the material in the hopper is continuously mechanically agitated has its temperature gradient extending both above and below the critical temperature range of the particulate material. If the rate of dispensing from the hopper is increased, or during start up, the temperature gradient is likely to be lowered throughout the height of the hopper, but since all particles in the hopper are agitated the material will always be disturbed during the critical temperature phase of operation.

While this invention has been described in detail with particular reference to preferred embodiments thereof, it will be understood that variations and modifications can be effected within the spirit and scope of the invention as described hereinbefore and as defined in the appended claims.

We claim:

1. A process of treating plastic particles having a critical temperature range in which the particles tend to cling together, comprising feeding the particles at a temperature below the critical temperature to the upper portion of a container, moving the particles downwardly through the container and dispensing the particles from a lower portion of the container, heating a stream of air to a temperature above the critical temperature range of the particles, moving the stream of heated air into the lower portion of the container and upwardly through the particles in the container and out of the upper portion of the container for heating the particles in the lower portion of the container to a temperature level above the critical temperature range of the particles and for heating the particles in an intermediate portion of the container through the critical temperature range of the particles and for heating the particles in the upper portion of the container up to the critical temperature range of the particles, and continuously agitating the particles in the intermediate portion of the container as the particles are heated from a temperature below the critical temperature range of the particles until the particles have been heated to a temperature above the critical temperature range of the particles.

2. The process of claim 1 and further including the step of removing moisture from at least a portion of the stream of air moving out of the upper portion of the container and recycling the dry air back through the container.

3. The process of claim 1 and wherein the step of agitating the particles comprises mechanically disturbing the particles at a plurality of elevations in the container.

4. The process of claim 1 and wherein the step of feeding the particles to the upper portion of the container comprises feeding the particles to the container until the particles assume a predetermined high level in the container and terminating the feeding of the particles in response to the high level of the particles, and initiating the feeding of the particles either when the level of the particles recedes below a second predetermined level or after a time delay initiated by the high level of the particles.

5. The process of claim 1 and wherein the step of agitating the particles comprises directing a stream of air into the particles.

6. The process of claim 1 and wherein the step of agitating the particles comprises continuously mechanically stirring the particles and directing a stream of air into the particles.

7. A processs of treating particles such as plastic particles having a critical temperature range in which the particles tend to stick together comprising feeding particles into a hopper, dispensing the particles from the lower end of the hopper, heating a stream of air to a temperature level higher than the critical temperature range of the particles and directing the stream of air into the lower portion of the hopper and exhausting the air from the upper portion of the hopper to create a temperature gradient in the particles which extends from a temperature below the critical temperature range of the material in the upper portion of the hopper and which reaches a temperature higher than the critical temperature range of the material, and continuously agitating the particles from a time prior to the particles reaching the critical temperature range of the particles until the temperature of the particles exceeds the critical temperature range of the particles to prevent the particles from clinging to one another as the temperature of the particles is increased through the critical temperature range.

8. The process of claim 7 and further including the step of recycling at least a portion of the exhausted stream of air from the upper portion of the hopper back to the lower portion of the hopper, and as the air is being recycled reducing the dew point of the recycled air.

9. The process of claim 7 and wherein the steps of feeding particles to the hopper and dispensing particles from the hopper comprises feeding the particles through an air lock and dispensing the particles through an air lock.

10. Apparatus for dispensing plastic particles of the type having a temperature range in which the particles tend to cling to one another comprising a hopper having a high temperature zone in its lower portion, a low temperature zone in its upper portion and an intermediate temperature zone intermediate its lower and upper portions, a particles inlet at the upper portion of said hopper, a particles outlet at the lower portion of said hopper, an air inlet at the lower portion of said hopper, an air outlet at the upper portion of said hopper, a mechanical agitating means comprising an agitator including an upright rotatable shaft extending downwardly into said hopper through said low temperature zone and intermediate temperature zone, and a plurality of blade means connected to said shaft at spaced intervals along the height of said shaft throughout said intermediate temperature zone and extending outwardly from said shaft at equal angles from one another, each of said blade means being approximately wedge-shaped in cross section with a thin leading edge for lifting the particles upwardly during rotation of said agitator, motor means mounted on the upper portion of said hopper and in driving connection with said shaft for rotating said shaft and blade means, air supply means including a blower with its air inlet communicating with the air outlet of said hopper and its air outlet communicating with the air inlet of said hopper for recirculating at least a portion of the air in said hopper, and means for heating the air as the air is recycled to a temperature higher than said temperature range, whereby the particles in the high temperature zone at the lower portion of said hopper and heated to a temperature higher than said temperature range, the particles in the intermediate temperature zone intermediate the lower and upper portions of said hopper are heated to a temperature gradient extending above and below said temperature range, and the particles in the low temperature zone are heated to a temperature lower than said temperature range, and the particles throughout said intermediate temperature zone are continuously agitated by said mechanical agitating means as the temperature of the particles increases through said temperature range to prevent the particles from clinging to one another.

* * * * *